United States Patent [19]

Ryang

[11] Patent Number: 4,826,929

[45] Date of Patent: May 2, 1989

[54] TOUGHENED BISMALEIMIDE RESIN SYSTEMS

[75] Inventor: Hong-Son Ryang, Camarillo, Calif.

[73] Assignee: BASF Corporation, Parsippany, N.J.

[21] Appl. No.: 100,635

[22] Filed: Sep. 24, 1987

[51] Int. Cl.$^4$ .......................................... C08F 283/12
[52] U.S. Cl. .................... 525/479; 526/262; 526/279; 528/26; 528/27; 528/28
[58] Field of Search ........................ 525/103, 479, 203; 528/26, 28, 27; 556/462, 447, 445; 526/262

[56] References Cited

U.S. PATENT DOCUMENTS

| | | | |
|---|---|---|---|
| 3,018,290 | 1/1962 | Sauers et al. ...................... | 260/326.3 |
| 3,018,292 | 1/1962 | Sauers et al. ...................... | 260/326.5 |
| 3,562,223 | 2/1971 | Lyon et al. ......................... | 260/78 |
| 3,627,780 | 12/1971 | Bennard et al. .................. | 260/326.3 |
| 3,717,615 | 2/1973 | Holub et al. ....................... | 528/28 |
| 3,770,691 | 11/1973 | McLoughlin et al. ........... | 260/37 N |
| 3,770,705 | 11/1973 | Akiyama et al. ................ | 260/78 UA |
| 3,839,358 | 10/1974 | Bargain et al. .................. | 260/326.26 |
| 3,879,491 | 4/1975 | Lindsey et al. .................. | 525/479 |
| 4,100,140 | 7/1978 | Zahir et al. ...................... | 526/90 |
| 4,238,591 | 12/1980 | Cassat et al. .................... | 528/26 |
| 4,351,932 | 9/1982 | Street et al. ..................... | 526/262 |
| 4,377,657 | 3/1983 | Street et al. ..................... | 524/424 |
| 4,544,728 | 10/1985 | Dien et al. ....................... | 528/28 |
| 4,608,426 | 8/1986 | Stern ................................. | 528/170 |

*Primary Examiner*—John C. Bleutge
*Assistant Examiner*—Ralph H. Dean, Jr.
*Attorney, Agent, or Firm*—William G. Conger

[57] ABSTRACT

Toughened heat-curable bismaleimide resin systems which contain alkenylphenoxy-terminated polysiloxane modifiers and compatibilizing agents. Cured resin systems exhibit increased toughness without a concomitant decrease in thermal stability at elevated temperatures.

3 Claims, No Drawings

TOUGHENED BISMALEIMIDE RESIN SYSTEMS

BACKGROUND OF THE INVENTION

1. Field of the Invention

The subject invention relates to high performance resin systems containing bismaleimides. More particularly, the subject invention relates to toughened bismaleimide resin systems prepared by adding tougheners which are alkenylphenoxy terminated polysiloxanes. The toughened resins find use as matrix resins in fiber-reinforced prepregs and composites, and as structural adhesives.

2. Description of the Related Art

Bismaleimide resin systems are noted for their high strength, high temperature performance, particularly as matrix resins in fiber-reinforced prepregs and composites. Unfortunately, bismaleimides tend to be somewhat brittle, and thus subject to impact-induced damage. For the same reasons, structural adhesives based on bismaleimides have not achieved the wide use attributable to more flexible resins such as the epoxies.

In the past, efforts have been made to toughen bismaleimides, for example, by the addition of acrylonitrile/butadiene elastomers to the resin system. Unfortunately, the degree of toughening available by this method is less than desirable. Moreover, a loss of heat resistance is seen as the amount of elastomeric toughener increases. Finally, the amount of toughener added is limited due to the formation of multiphase systems. Modifying bismaleimide systems with long chain, flexible epoxy resins has not proven successful for somewhat the same reason. Only minor amounts of epoxy resins are generally compatible with bismaleimide formulations.

The addition of alkenylphenols such as 2-allylphenol and 2-propenylphenol and their multiring homologues such as 2,2'-diallylbisphenol A has increased the toughness of bismaleimide resin systems, but once again, the degree of toughness obtained is less than that ultimately desirable. It would be desirable to prepare a toughener for bismaleimide resin systems which is compatible with other resin components, which forms a homogenous resin system and which does not cause a loss of heat resistance.

SUMMARY OF THE INVENTION

It has now been surprisingly discovered that polysiloxanes having their termini capped with alkenylphenols are compatible with bismaleimide resins and can be used in appreciable amounts to toughen such resins. The toughened systems which result maintain a high degree of thermal stability at elevated temperatures.

DESCRIPTION OF THE PREFERRED EMBODIMENTS

The alkenylphenoxy-terminated, polysiloxane modifiers of the subject invention are prepared through the reaction of an epoxy-functional polysiloxane with an alkenylphenol, generally in the presence of a catalyst which is effective in promoting the reaction of epoxy groups with phenolic hydroxy groups.

In the case of a difunctional polysiloxane, the general reaction may be illustrated as follows:

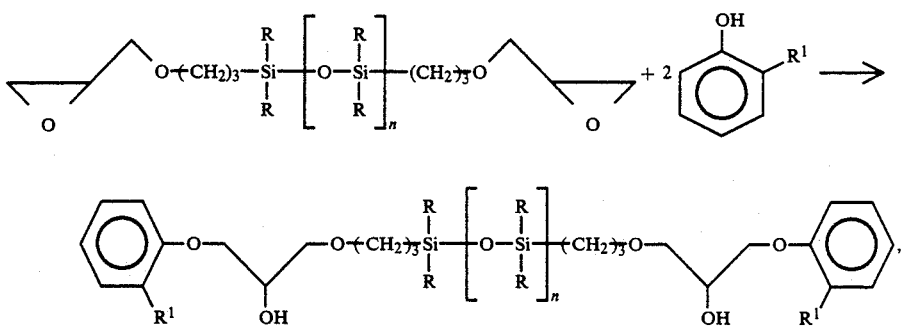

wherein each R may be individually selected from the group consisting of substituted and unsubstituted $C_1-C_6$ lower alkyl, $C_1-C_6$ lower alkoxy, aryl, acetoxy and cycloalkyl, and wherein $R^1$ is or $C_3-C_6$ alkenyl radical such as an allyl, or propenyl radical.

The epoxy-functional polysiloxanes are prepared by known methods. Preferably, these polysiloxanes are prepared through the equilibrium polymerization of the readily available bis(3-glycidoxypropyl)tetramethyldisiloxane with one or more cyclic persubsituted siloxanes, preferably octamethylcyclotetrasiloxane and octaphenylcyclotetrasiloxane. However other starting materials may be used. It is also possible to derivatize a silane-functional polysiloxane with an epoxy-group containing compound such as 3-glycidoxyallene.

The equilibrium polymerization is catalyzed by known catalysts such as the tetraalkylammonium salts, particularly tetramethyl and tetrabutylammonium hydroxide, and the tetraalkylammonium siloxanolates, particularly tetramethyl and tetrabutylammonium siloxanolates. For further information relative to epoxy-functional polysiloxanes, see J. Riffle, et. al. *Epoxy Resin Chemistry II*. pp. 24–25, Bauer, Ed. ACS Symposium Series No. 221, American Chemical Society.

The alkenylphenols utilized in preparing the alkenylphenoxy terminated polysiloxanes of the subject invention are commercially available from a number of sources. The alkenylphenols may be ortho or para-alkenyl mononuclear phenols or ortho-alkenyl polynuclear phenols, wherein the alkenyl group contains from 3 to about 6 carbon atoms. Examples of mononuclear alkenylphenols are 2- and 4-allylphenol, 2- and 4-propenylphenol, 2,5-diallylhydroquinone, and the like. Examples of polynuclear alkenylphenols include 2,2'-dialkenylbisphenols such as 2,2'-diallylbisphenol A, 2,2'-diallylbisphenol F and 2,2'-diallylbisphenol S and the corresponding dipropenyl compounds, and oligomeric polynuclear alkenylphenols corresponding to the formula:

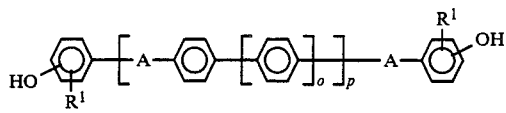

wherein A is selected from the group consisting of

wherein each $R^2$ may individually be aryl, cycloalkyl, or alkyl;

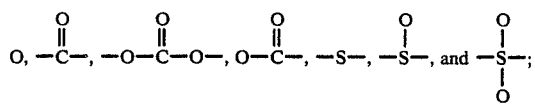

wherein o is an integer from 0 to about 2, and where p is an integer having values of from 1 to about 10 and wherein $R^1$ is a $C_3$-$C_6$ alkenyl group such as a substituted or unsubstituted allyl or propenyl group.

Such alkenylphenols may be readily prepared by known methods, for example by reacting the analogous phenol with allyl chloride or allyl bromide to form the allyloxy ether followed by a Claisen rearrangement to the allylphenol. The allylphenols may be easily rearranged to the corresponding propenylphenols by isomerization in alkali, for example by the process disclosed in *J. Am. Chem. Soc.* (1956) pp 1709–13.

The oligomeric alkenylphenols may be prepared by reaction of an excess of a diphenol or its alkali metal salt with an activated dihalobenzenoid compound, for example by the process disclosed in U.S. Pat. No. 4,175,175. Following formation of the phenol terminated oligomer, the allyl or propenyl ether is prepared as disclosed previously, followed by a Claisen rearrangement to the ortho-substituted alkenylphenol.

The reaction of the alkenylphenol with the epoxy-functional polysiloxane generally takes place at elevated temperatures, for example from 80°–200° C., preferably from 100°–150° C. The reaction generally requires catalysis by catalysts which promote the reaction between epoxies and phenols in a selective manner. Suitable catalysts are, for example tris-substituted phosphines and phosphonium salts, particularly triphenylphosphine, 2,5-dihydroxyphenylphosphonium hydroxide inner salts, phosphoranylidene succinic acid derivatives, and phosphoranylidene maleimide derivatives. Completion of the reaction may be determined by measuring epoxy equivalent weights by titration.

Preferred alkenylphenoxy terminated polysiloxanes are those prepared from 2-allylphenol, 2-propenylphenol, 2,2'-diallylbisphenol A, 2,2'-diallylbisphenol F, 2,2'-diallylbisphenol S or their corresponding 2,2'-dipropenyl analogs and bis (3-glycidoxypropyl)-polysiloxane polymers wherein the silicon atoms are disubstituted with methyl or phenyl groups. While the preferred modifiers are based on difunctional epoxy-terminated polysiloxanes because of their ready availability, modifiers based on polyfunctional epoxy-terminated or epoxy-substituted polysiloxanes are also possible and may be desirable in certain resin systems. The terms alkenylphenoxy-terminated polysiloxanes and epoxy-terminated polysiloxanes should be taken as including the corresponding polyfunctional siloxanes and their alkenylphenoxy derivatives as well. Because of their desirable properties and ready availability, the 2-, and 4-alkenylphenoxy-terminated linear polysiloxanes are preferred. Polysiloxanes derived from 3-alkenylphenols are not contemplated by the subject invention.

The use of the subject invention alkenylphenoxy-terminated polysiloxane modifiers in bismaleimide resin systems is generally accomplished by pretreatment of the bismaleimide with the alkenylphenoxy terminated polysiloxane modifier in the absence of catalyst in order to assure a uniform distribution of the modifier in the matrix resin. Pretreatment generally occurs over about the same temperature range used to prepare the modifier. Bismaleimide resin systems which are useful are well known to those skilled in the art. Particularly preferred bismaleimides are the commercially available eutectic bismaleimides which have relatively low softening points, such as Compimide ® 353 available from Boots-Technochemie.

These and other eutectic bismaleimides rely on the phenomenon whereby the melting point of a mixture of components is lower than that of the individual components themselves. Compimide ® 353, for example, contains three bismaleimides, the bismaleimides of 4,4'-diaminodiphenylmethane, 1,6-diamino-2,2,4-trimethylhexane, and 2,4-diaminotoluene.

The bismaleimides are preferably co-cured with a correactant which is an alkenylphenol or alkenyl-substituted aryl compound. Preferred alkenylphenol co-reactants are 2,2'-diallyl and 2,2'-dipropenylbisphenol A, 4,4'-bis(2-propenylphenoxy)benzophenone and 4,4'-bis(2-propenylphenoxy)diphenylsulfone. Preferred alkenyl-substituted aryl compounds are, for example, divinylbenzene and m-diisopropenylbenzene.

Epoxy resins may also be used as components of the toughened bismaleimide resin systems of the subject invention. These resins are well known to those skilled in the art and are described, for example, in the treatise *Handbook of Epoxy Resins* McGraw-Hill, ©1967. When epoxy resins are utilized, curing agents are generally utilized also. Such curing agents may be of the amine, anhydride, or phenolic type. Curing agents are described in the *Handbook of Epoxy Resins* in chapters 6–12.

Preferred epoxy resins are the glycidyl ethers of the bisphenols and tris(4-hydroxyphenyl)methane, and the analogous glycidyl derivatives of amines and aminophenols, particularly p-aminophenol, methylenedianiline, and 4,4'-diaminodiphenylsulfone. The glycidyl ethers of novolak resins, such as those based on phenol-formaldehyde and cresol-formaldehyde adducts, and the phenol or cresol derivatized di- and polycyclopentadienes are also well suited. The preferred curing agent is 4,4'-diaminodiphenylsulfone Cured products containing the alkenylphenoxyterminated polysiloxane modifiers of the subject invention exhibit improved mechanical properties without sacrificing thermal stability. The alkenylphenoxy-terminated polysiloxane modifiers also find use as precursors for radiation and free radical vulcanizable systems.

EXAMPLE 1

Preparation of Tetramethylammonium Siloxanolate

Into a 250 ml three-necked round-bottomed flask fitted with a mechanical stirrer and reflux condenser are placed octamethylcyclotetrasiloxane (118.6 g, 0.4 mol) and tetramethylammonium hydroxide pentahydrate (18.1 g, 0.1 mol). The mixture is stirred at 70° C. for 48 hr. under N₂ flow, adjusted to be sufficient to dehydrate the system. The resulting viscous syrup is used as a polymerization catalyst without further purification.

EXAMPLE 2

Preparation of an Epoxy Terminated DiphenylDimethypolysiloxane Copolymer

Octamethylcyclotetrasiloxane (534.4 g), Octaphenylcyclotetrasiloxane (534.4 g), bis (3-glycidoxypropyl)tetramethyldisiloxane (90.7 g), and tetramethylammonium siloxanolate (12.0 g) are charged to a 2.0 liter three necked round-bottomed flask equipped with a mechanical stirrer, reflux condenser, and nitrogen inlet. The resulting mixture is stirred at 80° C. for 48 hours under N₂. During this period of time, the viscosity of the reaction mixture is observed to increase and to then reach a stable value. Subsequently, the temperature of the mixture is raised to 150° C. for 4 hours to effect destruction of the catalyst. The reaction mixture is cooled to room temperature and filtered. The crude oligomer is purified by extracting the equilibrium cyclics with methanol (300 ml×2). After evaporation of methanol, the oligomer is further dried under mechanical pump vacuum (1 torr) at 150° C. The purified oligomer is a colorless, viscous oil (1100 g) having an epoxy equivalent weight (EEW) of 1210.

EXAMPLE 3

Preparation of an Epoxy Terminated Dimethylpolysiloxane

Using the general procedure described in Example 2, a reactor is charged with bis(3-glycidoxypropyl)tetramethyldisiloxane (18.3 g), octamethylcyclotetrasiloxane (182.0 g), and tetramethylammonium siloxanolate (1.4 g). The resulting mixture is heated to 80° C. for 48 hours and 50° C. for 4 hours under N₂. The reaction mixture is cooled to room temperature and filtered. Removal of low boiling fractions at 150° C. and 1 torr gives a colorless, viscous oil (180 g, EEW=2200).

EXAMPLE 4

Preparation of a 2-Allylphenoxy-Terminated DiphenylDimethylpolysiloxane

A 250 ml glass reactor is charged with the epoxy terminated siloxane from Example 2 (32.4 g), 2-allylphenol (5.2 g), and triphenylphosphine (0.07 g). The resulting mixture is heated to 130° C. for 12 hours. At the end of this time, the EEW of the mixture determined by titration shows complete consumption of the epoxy groups. Removal of excess 2-allylphenol under vacuum gives a 2-allylphenoxy-terminated siloxane copolymer as an odorless, clear oil.

EXAMPLE 5

Preparation of a 2-Propenylphenoxy Terminated Polysiloxane

A mixture of the epoxy terminated polysiloxane from Example 2 (32.4 g), 2-propenylphenol (5.2 g), and triphenylphosphine (0.07 g) is heated in the same manner as described in Example 4. Removal of excess 2-propenylphenol under vacuum gives a 2-propenylphenoxy-terminated siloxane copolymer as an odorless, clear oil.

EXAMPLES 6,7

Preparation of Heat-Curable Resin Compositions

The allylphenoxy-terminated polysiloxane copolymer (17.2 g) from Example 4 is treated with Compimide® 353 (Boots-Technochemie, 10 g) at 145° C. for 4 hours under N₂. To the pretreated mixture, additional Compimide® 353 (15 g), a glicidyl ether of tris (4-hydroxyphenyl)methane (Tactix® 742, Dow Chemical Co., 36 g), and a glicidyl ether of bisphenol A (DER ®332, Dow Chemical Co., 12 g) are added. The resulting mixture is stirred at 130° C. for 30 minutes. At 70° C., 3,3' diaminodiphenylsulfone (22 g), 4,4'-(p-aminophenoxy)diphenylsulfone (4.0 g), and a fumed silica (CAB-O-SIL, M-5, 3.6 g) are added while stirring. The resulting substrate is coated onto a 112 glass fabric. Similarly, a formulation is made with the propenylphenoxy-terminated polysiloxane copolymer from Example 5. In this case, pretreatment of the modifier was accomplished by heating at 135° C. for 3 hours. Aluminum single lap shear strengths are measured by following the method described in ASTM D-1002. Results are shown in Table I.

TABLE I

Lap shear strengths of cured resin compositions formulated with siloxane modifiers.

| Siloxane Modifier | Lap Shear Strength (psi) | |
|---|---|---|
| | 20° C. | 205° C. |
| from Example 4 | 1700 | 2600 |
| from Example 5 | 2000 | 2400 |

Cure:
177° C./4 Hours + 220° C./2 Hours + 250° C./1 Hour

EXAMPLE 8

A propenylphenoxy-terminated polysiloxane copolymer (8.3 g) from Example 5 is treated with Compimide® 353 (4.5 g) at 135° C. for 3 hours. To the above mixture, the bismaleimide of 4,4'-diaminodiphenylmethane (5.0 g), a glycidyl ether of 9,9'-di(4-hydroxyphenyl)fluorene (17 g), and a glycidyl ether of bisphenol F (XU ® 3336, CIBA-GEIGY. 6.0 g) are added. The resulting mixture is homogenized at 130° F. for 30 minutes. After addition of 4,4'-diaminodiphenylsulfone (8.0 g) and 2-Ethyl-4-methylimidazole (0.05 g) at 70° C., the final resin mixture is coated onto a 112 glass fabric. The adhesive is cured by heating for 4 hours at 177° C., 2 hours at 220° C. and 1 hour at 250° C. The single lap shear strengths (alumimum) are 2730 psi at 20° C. and 3230 psi at 205° C., respectively.

EXAMPLE 9

A reactor is charged with the epoxy-terminated dimethylsiloxane from Example 3 (22 g), 2-propenylphenol (2.0 g), and triphenylphosphine (0.04 g). The resulting mixture is heated to 135° C. for 10 hours under N₂. After confirming the completion of the reaction by titration, a diglycidyl ether of bisphenol F (1.0 g) and Compimide® 353 (6.0 g) are introduced. The resulting mixture is heated to 135° C. for 3 hours to obtain an opaque mixture. The above mixture (10.0 g) and dimethylbenzylamine (0.01 mg) are mixed in an aluminum dish and cured at 177° C. for 2 hours and 200° C. for 10 hours. The cured elastomer exhibits improved strength as compared to siloxane homopolymers. Thermogravimetric analysis (TGA) data of the elastomer are shown in Table II.

TABLE II

| Substrate | 5% Wt Loss | 10% Wt Loss |
| --- | --- | --- |
| Silicone-BMI | 400° C. | 430° C. |

The embodiments of the invention in which an exclusive privilege or property is claimed are defined as follows:

1. A toughened bismaleimide resin system, comprising:
   (a) a bismaleimide resin, and
   (b) an effective amount of a toughener comprising an alkenylphenoxy-terminated polysiloxane, wherein the alkenyl group contains from 3 to about 6 carbon atoms.

2. The system of claim 1 wherein said alkenylphenoxy-terminated polysiloxane is an allylphenoxy or propenylphenoxy-terminated polysiloxane.

3. The system of claim 2 wherein the silicon atoms of said polysiloxane are disubstituted with methyl radicals, phenyl radicals, or mixtures thereof.

* * * * *